United States Patent [19]

Renard et al.

[11] Patent Number: 5,483,817
[45] Date of Patent: Jan. 16, 1996

[54] SHORT CIRCUIT DETECTOR FOR SENSORS

[75] Inventors: Pascal Renard, Annemase, France; Michel Burri, Gd-Saconnex, Switzerland

[73] Assignee: Motorola, Inc., Schaumburg, Ill.

[21] Appl. No.: 257,263

[22] Filed: Jun. 8, 1994

[30] Foreign Application Priority Data

Jul. 2, 1993 [GB] United Kingdom ............... 93137313

[51] Int. Cl.⁶ .......................... G01C 17/38; G01C 25/00
[52] U.S. Cl. ............................. 73/2; 73/1 DV; 324/537; 324/503; 340/650
[58] Field of Search ................. 73/865.9, 2, 1 R, 73/1 J, 1 E, 1 DV; 340/870.16, 870.04, 650; 324/545, 537, 503; 204/401

[56] References Cited

U.S. PATENT DOCUMENTS

| | | | |
|---|---|---|---|
| 4,296,483 | 10/1981 | Haill | 73/1 DV |
| 4,299,114 | 11/1981 | Silvermetz | 73/1 DV |
| 4,537,065 | 8/1985 | Ootsuka | 73/4 R |
| 4,805,447 | 2/1989 | Meguro et al. | |
| 5,004,985 | 4/1991 | Holroyd | 73/1 DV |
| 5,070,843 | 12/1991 | Komurasaki | 73/1 DV |

FOREIGN PATENT DOCUMENTS 1369435 10/1974 United Kingdom.
1375389 11/1974 United Kingdom.

*Primary Examiner*—Kenneth A. Wieder
*Assistant Examiner*—Jose M. Solis
*Attorney, Agent, or Firm*—Robert D. Atkins

[57] ABSTRACT

A short circuit detector circuit (10) for detecting when a sensor (2), such as a tachometer sensor in automotive applications, is operating normally and when the sensor is short circuited is disclosed. The detector circuit (10) comprises a reference signal input (16) for receiving a reference signal, and a closed loop (22, 24, 12, 14, 26, 34, 32) having a predetermined loop gain (K). The closed loop has a first input coupled to the reference signal input, a first output (12) coupled to drive the sensor with a signal dependent on the input signal and the predetermined loop gain, a second input (14) for receiving a feed back signal from the sensor and a second output (36) coupled to the first input for providing an output response signal dependent on the operation of the sensor. The value of the predetermined loop gain is selected so that the output response signal is an undamped oscillation for normal sensor operation. The detector circuit (10) further comprises means (4, 50, 52, 54, 56,. 58, 60) for analysing the output response signal and for detecting normal sensor operation when the output response signal is an undamped oscillation and for detecting short circuit sensor operation when the output response signal is a damped oscillation.

9 Claims, 4 Drawing Sheets

TEST IN CLOSED LOOP (TACHOMETER NON-SHORT CIRCUITED)

TEST IN CLOSED LOOP (TACHOMETER SHORT CIRCUITED)

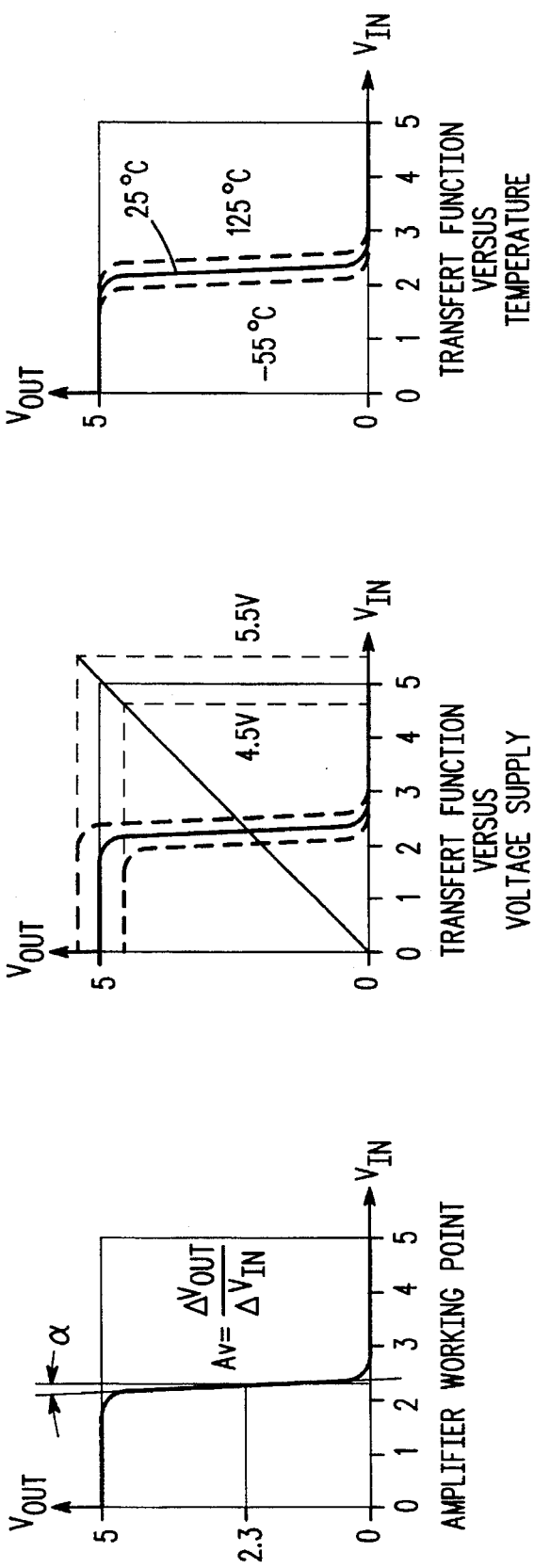
FIG.10 TRANSFERT FUNCTION VERSUS TEMPERATURE
FIG.9 TRANSFERT FUNCTION VERSUS VOLTAGE SUPPLY
FIG.8 AMPLIFIER WORKING POINT
$Av = \dfrac{\Delta V_{OUT}}{\Delta V_{IN}}$
FIG.12 CMOS INVERTER AS AMPLIFIER
FIG.11 CMOS INVERTER

SHORT CIRCUIT DETECTOR FOR SENSORS

This invention relates to a short circuit detector for sensors.

BACKGROUND OF THE INVENTION

In many systems which have sensor networks for sensing system operating parameters, filters are used in the sensor networks in order to optimise the operation of the network: for example, to ensure good noise immunity and to limit the voltage supplied from the sensor. The latter is particularly important for tachometer (tacho) sensors in automotive applications. Typically, the time constants of the inductive and capacitive sensors of the networks are low compared to that of the filters. For these applications therefore, the sensors require close monitoring in order to ensure their proper operation.

By monitoring the DC current flowing through the sensor, it is possible to determine whether the sensor is tied to ground, tied to the power supply or whether the sensor is disconnected. However, this type of monitoring does not allow for the detection of a short-circuited sensor due to the low internal inductance of the sensor compared to the other components in the network.

One method of detecting sensor short-circuit is to apply a step or Dirac pulse to the network and observe the closed loop system response. However for tachometer sensors, such a method does not accurately or reliably discriminate between the short-circuited or not short-circuited sensor response. Furthermore, the time constant of the tachometer sensor, when combined with the passive filter components, becomes insignificant compared to the other time constants of the network.

SUMMARY OF THE INVENTION

Thus, it is an object of the invention to provide an improved short-circuit detector for a inductive or capacitive sensor.

In accordance with the present invention there is provided a short circuit detector circuit for detecting when a sensor is operating normally and when the sensor is short circuited comprising:

a reference signal input for receiving a reference signal;

closed loop means having a predetermined loop gain, the closed loop means having a first input coupled to the reference signal input, a first output coupled to drive the sensor with a signal dependent on the input signal and the predetermined loop gain, a second input for receiving a feed back signal from the sensor and a second output coupled to the first input for providing an output response signal dependent on the operation of the sensor, the value of the predetermined loop gain being selected so that the output response signal is an undamped oscillation for normal sensor operation;

means for analysing the output response signal and for detecting normal sensor operation when the output response signal is an undamped oscillation and for detecting short circuit sensor operation when the output response signal is a damped oscillation.

BRIEF DESCRIPTION OF THE DRAWINGS

A short circuit detector circuit in accordance with the present invention will now be described, by way of example only, with reference to the accompanying drawings in which:

FIGS. 8, 9, and 10 show graphs of the transfer functions of a reference voltage amplifier used in the short circuit detector circuit in accordance with the present invention;

FIG. 11 shows a CMOS inverter in accordance with the present invention;

FIG. 12 shows a CMOS inverter configured as an amplifier in accordance with the present invention;

DETAILED DESCRIPTION OF THE DRAWINGS

Figure 1:
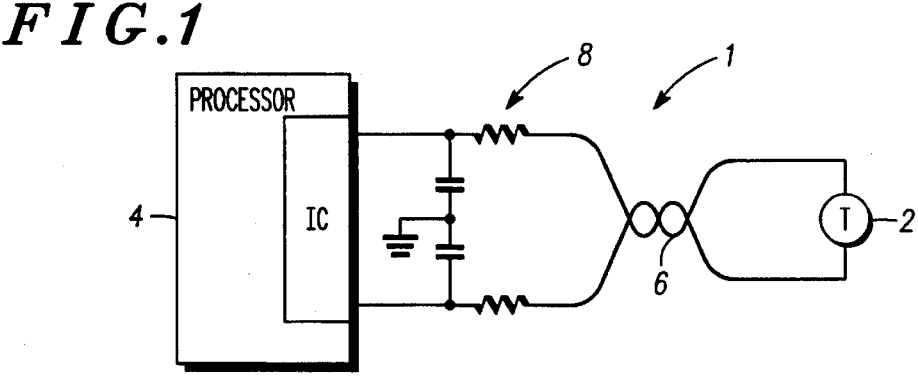
FIG. 1 is a block schematic diagram of an automotive sensor network.

Referring firstly to FIG. 1, in a preferred automotive sensor network 1, the output signals from a tacho sensor 2 are coupled to a processor 4 via a twisted wire pair 6 and filter circuitry 8. The processor 4 analyses the signals from the tacho sensor and in response thereto, controls the operation of the engine accordingly.

In order to determine whether the tacho sensor 2 is operating normally, the processor 4 must be able to detect whether one or both of the wires of the twisted wire pair 6 are short circuited to ground, short circuited to a power supply, open circuited or when the wires are short circuited together. As discussed above, the prior art methods cannot accurately and reliably determine when the wires are short circuited together. The invention attempts to overcome this problem by providing a short circuit detector circuit which reliably detects when the wires are short circuited together.

Figure 2:
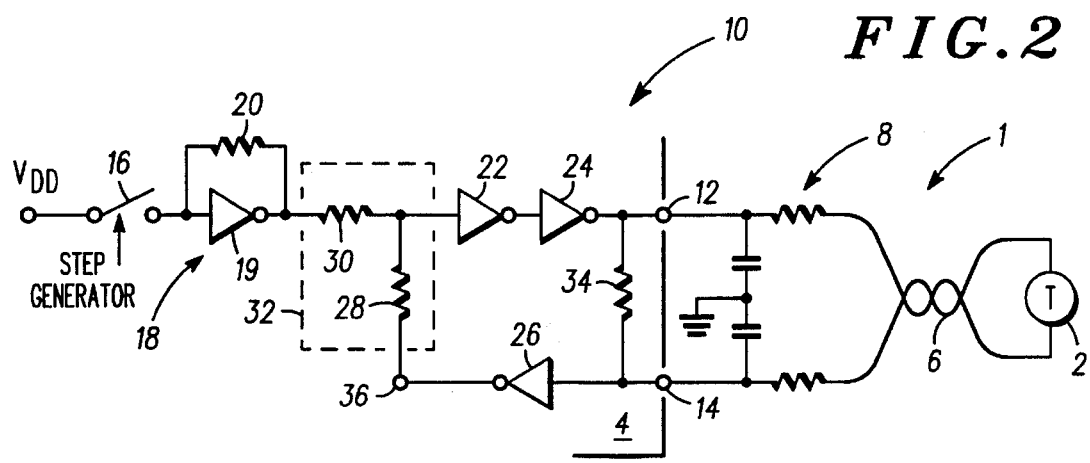
FIG. 2 is a block schematic diagram of the network of FIG. 1 incorporating a short circuit detector circuit in accordance with the present invention.

Referring now also to FIG. 2, a short circuit detector circuit 10 in accordance with a preferred embodiment of the present invention for monitoring the output signals from the tacho sensor 2 is preferably incorporated in the processor 4. Like components to those of FIG. 1 are referred to by the same reference numerals. Alternatively, the short circuit detector circuit may be implemented in an interface circuit which acts as an interface between the processor and tacho sensor. It will be appreciated that it is not intended that the detector circuit in accordance with the invention be implemented exclusively with tacho sensors. The invention can be used with any inductive or capacitive sensors or actuators.

The circuit 10 is a closed loop arrangement and comprises two terminals 12, 14 coupled to respective wires of the twisted wire pair 6 via filter circuitry 8 and an input 16 coupled to receive a step pulse signal from a step signal generator (not shown). The step pulse signal at the input 16 is coupled to a reference voltage amplifier 18 which comprises an inverting HCMOS transistor gate 19 coupled in a resistive feedback loop having a resistance 20. Such an arrangement provides an output voltage signal having a level of approximately half the voltage level supplied at the input. The output signal from the reference voltage amplifier 18 is fed to the terminal 12 via two inverters 22, 24. This output signal is coupled to the tacho sensor 2 and fed back to terminal 14 via the twisted wire pair 6. A comparator 32 which comprises resistors 30 and 28 compares the output signal from the reference voltage amplifier 18 with the feed back signal coupled thereto from terminal 14 via inverter 26. Inverters 22, 24 and 26 determine the loop gain. A resistor 34 is coupled across the terminals 12 and 14 in order to prevent oscillation due to external capacitors, resistors and the tacho sensor 2 which occurs when the sensor network is open.

Figure 3:
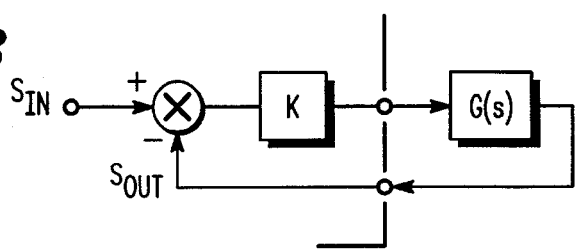
FIG. 3 is an equivalent electrical block diagram of the circuit of FIG. 2.

FIG. 3 shows the equivalent electrical block diagram for the circuit of FIG. 2, where Sin is the output of the reference voltage amplifier 18, Sout is the feedback signal from terminal 14, K is the gain of the loop and G(s) represents the transfer function of the sensor network. For normal operation, the transfer function has three poles. When the tacho sensor 2 is short circuited, the number of poles is reduced to two. This produces a difference in the dynamic response of the network.

If one considers the mathematical model of the sensor network of FIGS. 2 and 3, the characteristic equation of the network is $$\frac{Sout}{Sin} = \frac{K\,G(s)}{1 + K\,G(s)} \qquad (1)$$

Figure 4:
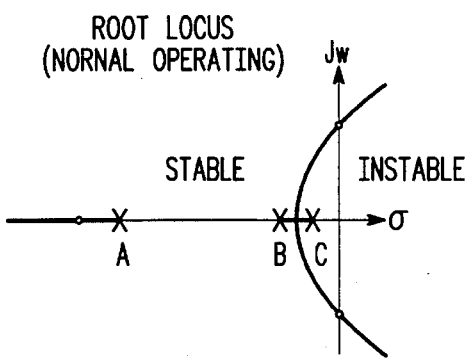
FIG. 4 is a representation of the root locus for normal operation of the circuit of FIG. 2.
Figure 5:
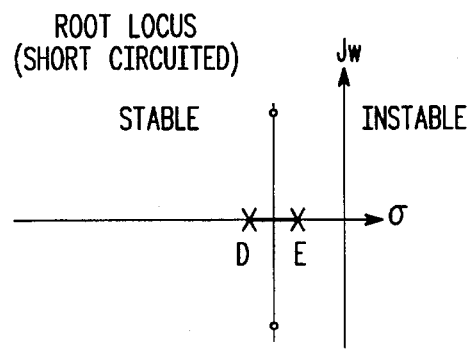
FIG. 5 is a representation of the root locus for short circuit operation of the circuit of FIG. 2.

The difference in the dynamic response of the network is apparent when the root locus in the S-plane is plotted, with varying loop gain, from the characteristic equation (1). FIGS. 4 and 5 show the root locus for the closed loop network for normal operation having three poles A, B, C and short circuit operation having two poles D, E respectively. Thus, the roots of the characteristic equation determine the character of the dynamic response of the network.

Figure 6:
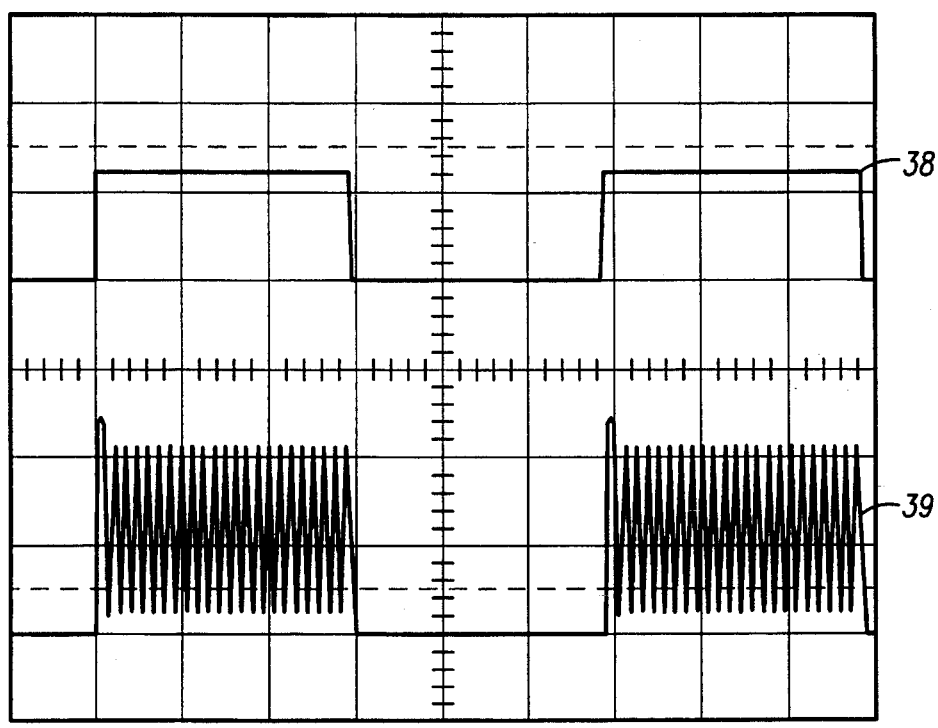
FIG. 6 is a representation of the closed loop dynamic response of the circuit of FIG. 2 for normal operation.

As can be seen in FIG. 4, the dynamic response of the sensor network depends on the loop gain K and is either convergent (stable), on the left of the imaginary axis Jw or divergent (unstable), on the right of the imaginary axis Jw. By selecting a predetermined loop gain K, it can be arranged for the root locus to intercept the imaginary axis. At this predetermined loop gain, the dynamic response is a relaxed oscillation. Thus, the loop gain is computed in order to ensure that the dynamic response for normal operation is a relaxed oscillation. In this case, when the processor 4 analyses the feedback signal, at for example terminal 36, it will detect a signal such as that shown in FIG. 6. FIG. 6 shows the step pulse signal 38 applied at the input terminal 16 and the feedback signal 39 at terminal 36.

Figure 7:
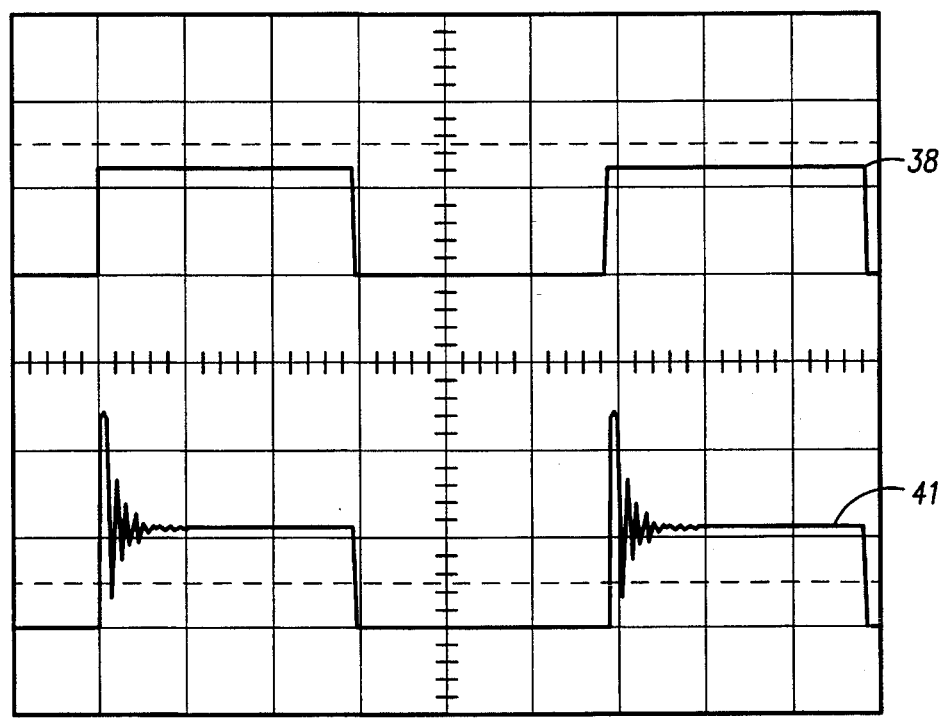
FIG. 7 is a representation of the closed loop dynamic response of the circuit of FIG. 2 for short circuit operation.

FIG. 5 shows the root locus when the tacho sensor 2 is short circuited. As discussed above the number of poles is reduced to two (D, E). Since the root locus will always be parallel to the imaginary axis Jw, the dynamic response of the sensor network will always be damped (stable) irrespective of the loop gain. Thus, when the tacho sensor 2 is short circuited, the dynamic response is a damped oscillation. The feedback signal at terminal 36 will therefore appear such as that shown in FIG. 7. FIG. 7 shows the step pulse signal 38 applied at the input 16 and the damped dynamic response 41 at the terminal 36.

Thus, by selecting a predetermined loop gain, and by observing the feedback signal at terminal 36, the processor 4 can determine whether the sensor is working normally or is short circuited.

Figure 13:
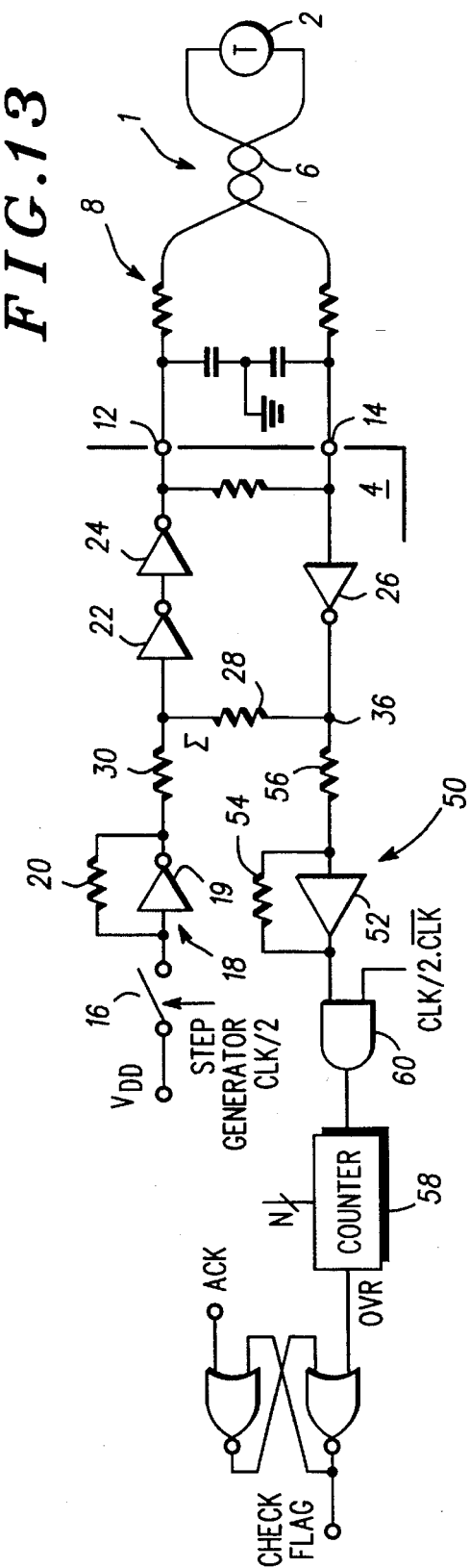
FIG. 13 is a block schematic diagram of FIG. 2 incorporating a circuit for monitoring its closed loop dynamic response for short circuit detection.

The relaxed or damped oscillation response feedback signal may be observed using, for example, a counter and schmitt trigger to analyse the voltage signal at terminal 36 during the second half of the pulse period. An example of such a circuit is shown in FIG. 13.

A schmitt trigger 50 is formed by two inverting HCMOS transistor gates 52 coupled in a resistive feedback loop having a resistance 54 and a resistance 56. The hysteresis factor is determined by the ratio of the resistances 54 and 56. The output of the schmitt trigger 50 is coupled to a first input of an AND gate 60. A second input of the AND gate 60 is coupled to receive a signal CLK/2$\overline{CLK}$ which is dependent on the signal provided at input 16. The output from the schmitt trigger 50 is therefore arranged to be sampled in a window spanning part of the step signal 38. An output of AND gate 60 clocks a counter 58 which has an overflow output coupled to a check flag (CF). When the tacho sensor 2 is operating normally, the output of the AND gate 60 increments the counter until a predetermined count is reached whereby the overflow signal (OVR) is generated. The overflow signal (OVR) sets the check flag (CF). When the tacho sensor 2 is short circuited, the schmitt trigger output signal is filtered by the counter 58. Thus, no overflow signal (OVR) is generated and the check flag (CF) is not set. The processor 4 reads the state of the check flag (CF) so as to determine the operating state of the tacho sensor 2. The check flag can be reset by an acknowledge flag (ACK) generated by the processor 4. Thus, the state of the check flag (CF) indicates whether the sensor is operating normally (i.e. relaxed oscillation) or short circuited (damped oscillation).

The loop gain depends on the passive components used in the circuit (the inverters 22, 24 and 26) and remains constant irrespective of the tacho sensor's specification, temperature and voltage variations. This is due in part to the CMOS inverter implementation of the reference voltage amplifier 18, since reference voltage amplifier 18 will always provide an output voltage at a point midway between the two switching states of the gate irrespective of voltage drift and temperature drift (see FIGS. 8, 9, 10, 11 and 12).

In summary, the short circuit detector circuit in accordance with the present invention provides a simple and reliable means to detect a short circuit in a capacitive or inductive sensor or actuator. An advantage of the invention is that the behaviour of the sensor can still be determined even when the dynamic response of the sensor is much less than that of the network as a whole. Furthermore, by using a CMOS inverter as an amplifier, the invention can be simply implemented in a MCU at very low cost. Further, the use of CMOS inverters having a transfer function in the S-plane, allows for the self-tuning of the loop gain so as to ensure relaxed oscillation.

Figure 14:
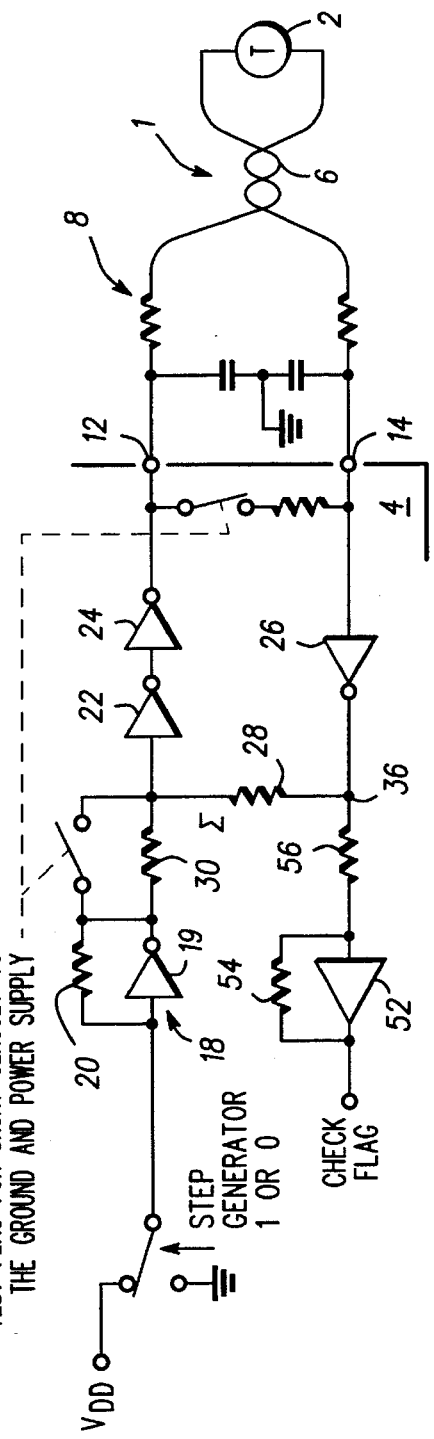
FIG. 14 is a block schematic diagram of FIG. 2 incorporating a circuit for monitoring short circuit to ground, to power supply and open circuit sensor operation.

The monitoring circuit in accordance with the invention also allows for the detection of a short circuit to ground or to the power supply or open circuit without a significant hardware modification of the network. An example of such a circuit is shown in FIG. 14. To test whether the tacho sensor 2 is short circuited to ground or to the power supply or open, the processor 4 for a predetermined period provides a '1' or '0' signal to the input of the reference voltage amplifier 18. In dependence on the setting values, such as the loop gain, and by monitoring the state of the check flag (CF), the processor 4 can monitor the operation using an exclusive OR function to determine whether a malfunction has occurred and the kind of malfunction. For example, the sensor is operating normally if the check flag has the '1' state or the '0' state for an input signal of '1' or '0' respectively. The sensor has malfunctioned, if the check flag has the '1' state or the '0' state for an input signal of '0' or '1' respectively. The switches SW1 and SW2 are activated by the processor 4 in order to enter this monitoring sequence.

This invention can be used in networks using either inductive sensors or capacitive sensors and also for sensors having a very low time constant compared to the components in the rest of the network. This invention can also be used with a network having two poles in normal operation and one pole when the sensor is short circuited.

The invention may be used in ABS systems, engine management systems and gear box control systems.

What we claim is:

1. A short circuit detector circuit for detecting when a sensor is operating normally and when the sensor is short circuited, comprising:

a reference signal input for receiving a reference signal;

closed loop means having a predetermined loop gain, the closed loop means having a first input coupled to the reference signal input, a first output coupled to drive the sensor with a signal dependent on the input signal and the predetermined loop gain, a second input for receiving a feed back signal from the sensor, and a second output coupled to the first input for providing an output response signal dependent on the operation of the sensor, where the value of the predetermined loop gain is selected so that the output response signal is an undamped oscillation for normal sensor operation; and means for analysing the output response signal and for detecting normal sensor operation when the output response signal and for detecting normal sensor operation when the output response signal is an undamped oscillation and for detecting short circuit sensor operation when the output response signal is a damped oscillation.

2. The short circuit detector circuit according to claim 1 wherein the means for analysing comprises:

detecting means coupled to receive the output response signal for providing an output signal having a first state when the output response signal reaches a maximum predetermined threshold level and an output signal having a second state when the output response signal reaches a minimum predetermined threshold level, the predetermined minimum and maximum threshold levels being selected so that an output signal successively switching between the first and second states is generated for the undamped oscillating output response signal and an output signal having one of the first or second states is generated for the damped oscillating output response signal; and counting means for counting when the output signal switches between the first and second states and for providing a flag set signal which sets a flag when the count reaches a predetermined number, the set flag indicating an undamped oscillating output response signal and an unset flag indicating a damped oscillating output response signal.

3. The short circuit detector circuit according to claim 2 further comprising sampling means coupled between the detecting means and the counting means for sampling the detecting means output signal during a predetermined time slot of the period of the output response signal and for providing the output signal to the counting means during the predetermined time slot.

4. The short circuit detector circuit according to claim 3 wherein the detecting means comprises a schmitt trigger and the sampling means comprises an AND gate having a first input coupled to receive the detecting means output signal, a second input coupled to receive a clock signal which is dependent on the reference signal and an output coupled to the counting means.

5. The short circuit detector circuit according to claim 1 wherein the closed loop means comprises at least one gate means having a predetermined gain, the loop gain being dependent on the gain of the at least one gate.

6. The short circuit detector circuit according to claim 5 wherein the at least one gate means comprises a CMOS inverter.

7. The short circuit detector circuit according to claim 1 wherein the reference signal is a step pulse signal.

8. An automotive sensor arrangement comprising:

an automotive sensor; and a short circuit detector circuit for detecting when a sensor is operating normally and when the sensor is short circuited comprising:

a reference signal input for receiving a reference signal;

closed loop means having a predetermined loop gain, the closed loop means having a first input coupled to the reference signal input, a first output coupled to drive the sensor with a signal dependent on the input signal and the predetermined loop gain, a second input for receiving a feed back signal from the sensor and a second output coupled to the first input for providing an output response signal dependent on the operation of the sensor, the value of the predetermined loop gain being selected so that the output response signal is an undamped oscillation for normal sensor operation;

means for analysing the output response signal and for detecting normal sensor operation when the output response signal is an undamped oscillation and for detecting short circuit sensor operation when the output response signal is a damped oscillation, the first output and second input of the closed loop means being coupled to the automotive sensor via first and second wires.

9. An automotive sensor arrangement according to claim 8 wherein the automotive sensor comprises a tachometer sensor.

* * * * *

UNITED STATES PATENT AND TRADEMARK OFFICE
CERTIFICATE OF CORRECTION

PATENT NO. : 5,483,817
DATED : January 16, 1996
INVENTOR(S) : Pascal Renard, Michel Burri It is certified that error appears in the above-indentified patent and that said Letters Patent is hereby corrected as shown below:

In Claim 1, column 5, line 34, delete "analysing" and insert --analyzing-- therefor.

In Claim 1, column 5, line 36, delete "and for detecting normal sensor operation when the output response signal".

Signed and Sealed this

Fifteenth Day of July, 1997

Attest:

BRUCE LEHMAN

Attesting Officer

Commissioner of Patents and Trademarks